United States Patent
Lee (10) Patent No.: US 7,221,426 B2
(45) Date of Patent: May 22, 2007

(54) DISCHARGING METHOD OF IN-PLANE SWITCHING MODE LIQUID CRYSTAL DISPLAY DEVICE

(75) Inventor: Sang-Hyuk Lee, Ulsan (KR)

(73) Assignee: LG. Philips LCD Co., Ltd, Youngdungapo-ku, Seoul (KR)

( * ) Notice: Subject to any disclaimer, the term of this patent is extended or adjusted under 35 U.S.C. 154(b) by 73 days.

(21) Appl. No.: 10/670,380

(22) Filed: Sep. 26, 2003

(65) Prior Publication Data

US 2004/0070719 A1    Apr. 15, 2004

(30) Foreign Application Priority Data

Sep. 26, 2002    (KR) ...................... 10-2002-0058557

(51) Int. Cl.
*G02F 1/133* (2006.01)

(52) U.S. Cl. .................. 349/187; 349/40; 349/141

(58) Field of Classification Search ................ 349/40, 349/42, 141, 187, 192; 324/770; 438/30; 445/24, 25
See application file for complete search history.

(56) References Cited

U.S. PATENT DOCUMENTS

| | | | |
|---|---|---|---|
| 5,598,285 A | | 1/1997 | Kondo et al. |
| 5,684,557 A | * | 11/1997 | Matsuda ...................... 349/187 |
| 5,742,173 A | * | 4/1998 | Nakagomi et al. .......... 324/758 |
| 5,838,037 A | | 11/1998 | Masutani et al. |
| 5,946,060 A | | 8/1999 | Nishiki et al. |
| 5,990,987 A | | 11/1999 | Tanaka |
| 6,028,653 A | | 2/2000 | Nishida |
| 6,097,454 A | | 8/2000 | Zhang et al. |
| 6,266,166 B1 | | 7/2001 | Katsumata et al. |
| 6,853,435 B2 | * | 2/2005 | Tanaka et al. .............. 349/177 |
| 2002/0101547 A1 | * | 8/2002 | Lee et al. ...................... 349/40 |
| 2003/0178467 A1 | * | 9/2003 | Lee et al. ...................... 228/42 |
| 2003/0214614 A1 | * | 11/2003 | Chung .......................... 349/58 |

FOREIGN PATENT DOCUMENTS

| | | |
|---|---|---|
| JP | 9-5764 | 1/1997 |
| JP | 9-73101 | 3/1997 |

OTHER PUBLICATIONS

Abstract of JP 09-213597, published Aug. 1997.*
R. Kiefer et al., "In-Plane Switching of Nematic Liquid Crystals", Japan Display '92, pp. 547-550.
M. Ohta et al., "Development of Super-TFT-LCDs with In-Plane Switching Display Mode", Asia Display '95, pp. 707-710.

(Continued)

*Primary Examiner*—Toan Ton
*Assistant Examiner*—Tai Duong
(74) *Attorney, Agent, or Firm*—McKenna Long & Aldridge LLP (57) ABSTRACT

A method for discharging a in-plane switching mode liquid crystal display panel including: providing a color filter substrate and a thin film transistor substrate; forming a liquid crystal layer between the color filter substrate and the thin film transistor substrate thus to form a liquid crystal display panel; and discharging at least one surface of the liquid crystal display panel.

15 Claims, 7 Drawing Sheets

OTHER PUBLICATIONS

M. Oh-e, et al., "Principles and Characteristics of Electro-Optical Behaviour with In-Plane Switching Mode", Asia Display '95, pp. 577-580.

S. Matsumoto et al., "Display Characteristics of In-Plane-Switching (IPS) LCDs and a Wide-Viewing-Angle", Euro Display '96, pp. 445-448.

H. Wakemoto et al., "An Advanced In-Plane-Switching Mode FTF-LCD", Sid 97 Digest, pp. 929-932.

S.H. Lee et al., "High-Transmittance, Wide-Viewing-Angle Nematic Liquid Crystal Display Controlled by Fringe-Field Switching", Asia Display 98, pp. 371-374.

* cited by examiner

DISCHARGING METHOD OF IN-PLANE SWITCHING MODE LIQUID CRYSTAL DISPLAY DEVICE

The present invention claims the benefit of Korean Patent Application No. 58557/2002 filed in Korea on Sep. 26, 2002, which is hereby incorporated by reference.

BACKGROUND OF THE INVENTION

1. Field of the Invention

The present invention relates to a liquid crystal display device, and more particularly, to a discharging method of an in-plane switching mode liquid crystal display panel for removing stain due to static electricity generated in processing the liquid crystal display panel.

2. Description of the Related Art

Generally, a twisted nematic mode liquid crystal display (LCD) device mainly used as a flat panel display device of high picture quality and low electric power consumption has a narrow viewing angle. This narrow viewing angle is due to a refractive anisotropy property of liquid crystal molecules. The refractive anisotropy of the liquid crystal molecules is itself caused by a change in an orientation of the liquid crystal molecules when a voltage is applied to a liquid crystal display panel. Specifically, the liquid crystal molecules originally aligned in a horizontal direction with respect to a substrate are subsequently aligned vertically with respect to the substrate when the voltage is applied to the liquid crystal display panel. Accordingly, in-plane switching mode liquid crystal display devices are actively being investigated to solve the viewing angle problem by aligning the liquid crystal molecules horizontally with respect to the substrate.

Figure 1:
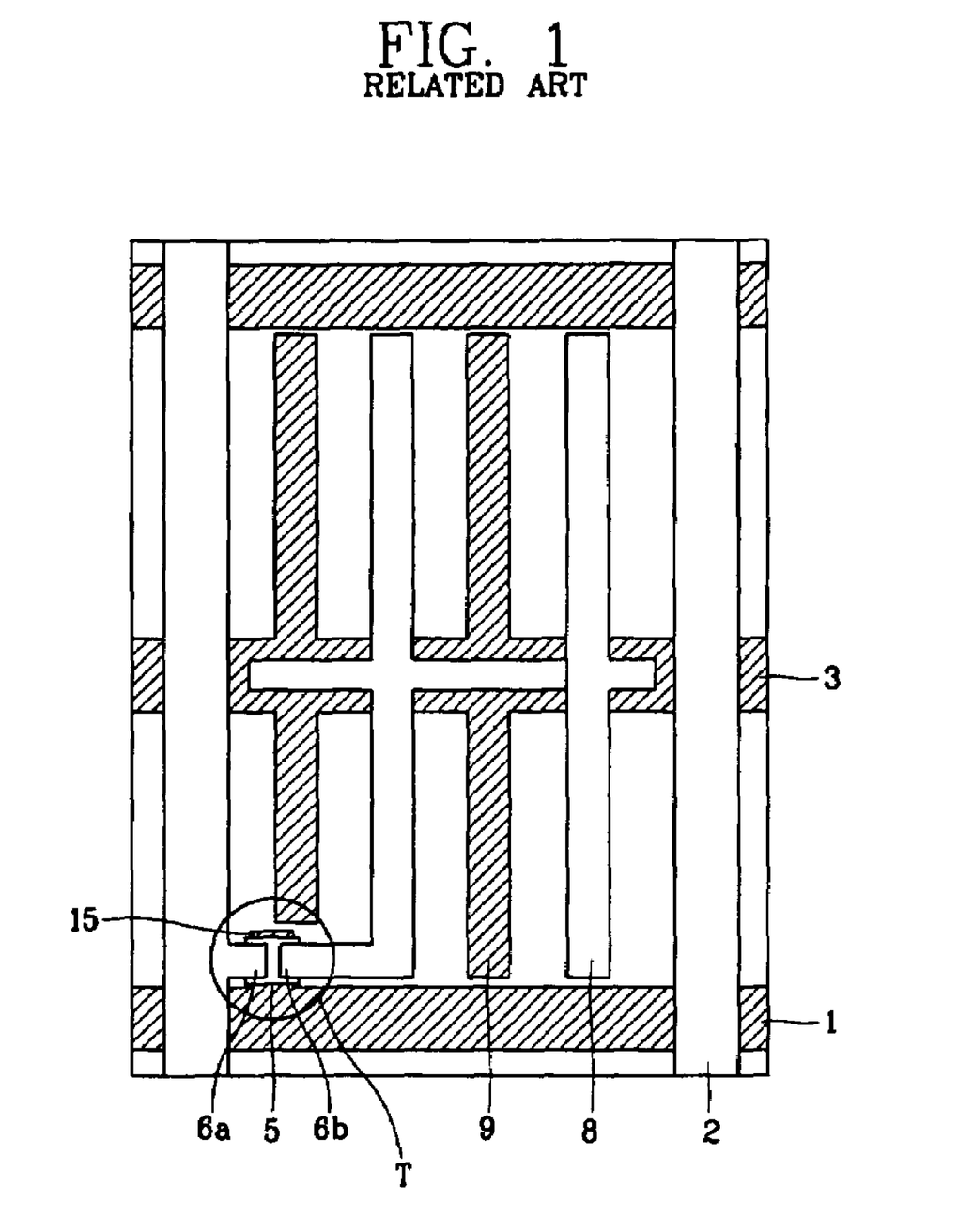
FIG. 1 is a plan view showing an in-plane switching mode LCD device in accordance with the related art.

FIG. 1 is an in-plane switching mode LCD device in accordance with the related art. As shown in the FIG. 1, a gate line 1 and a data line 2 are arranged horizontally and vertically, respectively, on a transparent substrate to define a pixel region. In a typical liquid crystal display device, N gate lines 1 and M data lines 2 are crossed to define an array of N×M pixels. However, in FIG. 1, only one pixel is shown for a simplicity.

A thin film transistor T is disposed at an intersection of the gate line 1 and the data line 2. A common line 3 is disposed in the pixel region in parallel with the gate line 1. Moreover, at least a pair of electrodes, specifically, a pixel electrode 8 and a common electrode 9, are formed in the pixel region. The pixel electrode 8 and the common electrode 9 are arranged in parallel with each other for switching the liquid crystal molecules. The pixel electrode 8 is connected to a drain electrode 6b of the thin film transistor T, and the common electrode 9 is connected to the common line 3. Accordingly, an external voltage is applied across the thin film transistor T to generate a lateral electric field between the pixel electrode 8 and the common electrode 9.

Figure 2A:
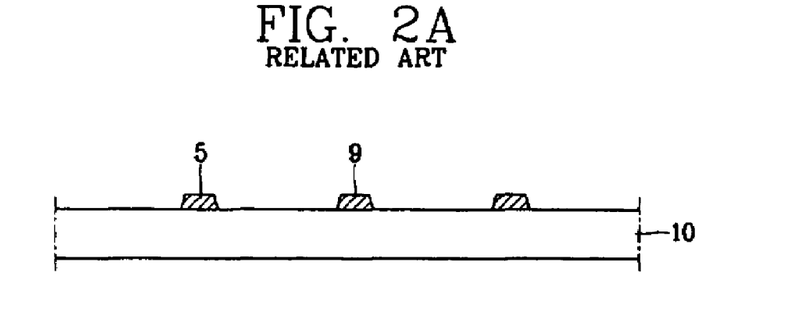
FIG. 2A depicts the deposition of a metal layer as a processing step in a fabricating method of an in-plane switching mode LCD device in accordance with the related art.

FIG. 2A depicts the deposition of a first metal layer as a processing step in a fabricating method of an in-plane switching mode LCD device in accordance with the related art. As shown in FIG. 2A, a first metal layer is deposited on a first transparent substrate 10 by a sputtering method. Thus, the first metal layer is photo-etched to form a gate electrode 5 and a common electrode 9.

Figure 2B:
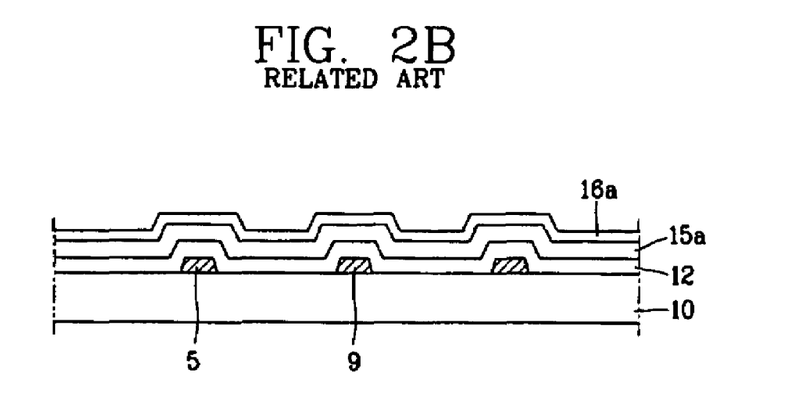
FIG. 2B depicts the deposition of amorphous silicon as a processing step in a fabricating method of an in-plane switching mode LCD device in accordance with the related art.

FIG. 2B depicts the deposition of amorphous silicon as a processing step in a fabricating method of an in-plane switching mode LCD device in accordance with the related art. As shown in FIG. 2B, SiOx or SiNx, amorphous silicon (a-Si), and impurity amorphous silicon ($n^+$ a-Si) are subsequently deposited to form a gate insulating layer 12, a-Si layer 15a, and $n^+$ layer 16a.

Figure 2C:
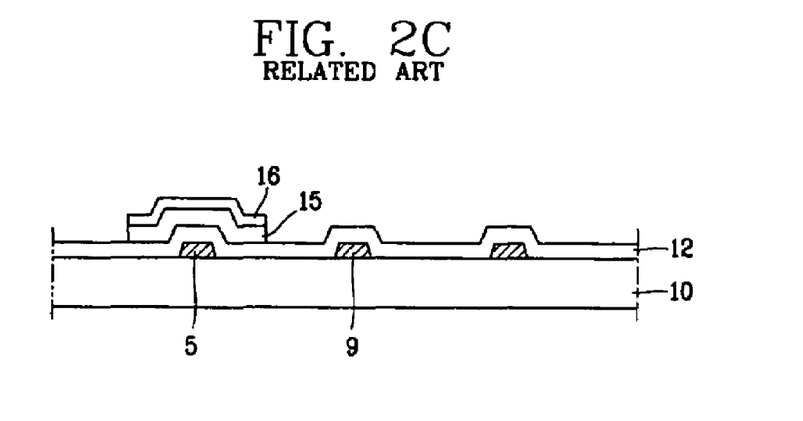
FIG. 2C depicts a patterning step in a fabricating method of an in-plane switching mode LCD device in accordance with the related art.

FIG. 2C depicts a patterning step in a fabricating method of an in-plane switching mode LCD device in accordance with the related art. As shown in FIG. 2C, the a-Si layer 15a and the $n^+$ layer 16a are subsequently patterned to form a semiconductor layer 15 and an ohmic contact layer 16.

Figure 2D:
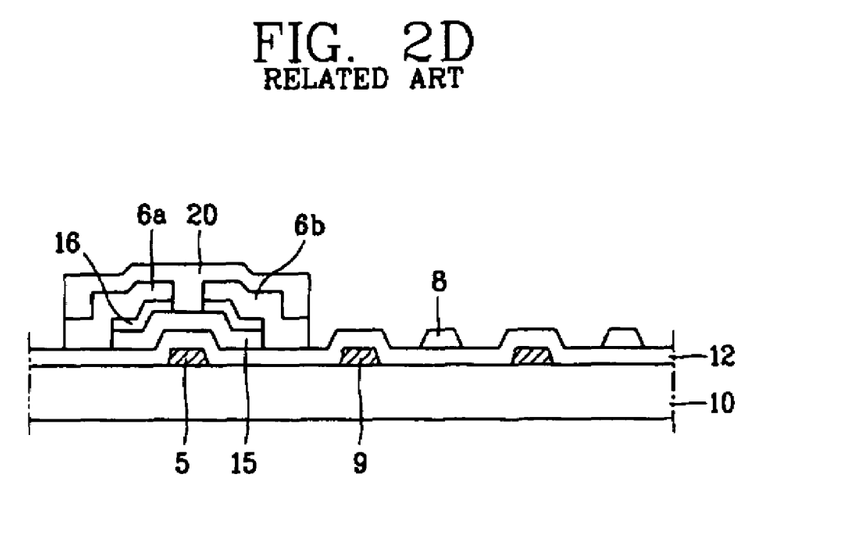
FIG. 2D depicts a step of depositing a second metal layer in a fabricating method of an in-plane switching mode LCD device in accordance with the related art.

FIG. 2D depicts a step of depositing a second metal layer in a fabricating method of an in-plane switching mode LCD device in accordance with the related art. As shown in FIG. 2D, a second metal layer is deposited and patterned to form a source electrode 6a, a drain electrode 6b, and a pixel electrode 8. Then, a passivation film 20 is formed entirely thereon. The passivation film 20 in the pixel region is thereafter removed in order to strengthen the intensity of a lateral field applied between the common electrode 9 and the pixel electrode 8.

Figure 2E:
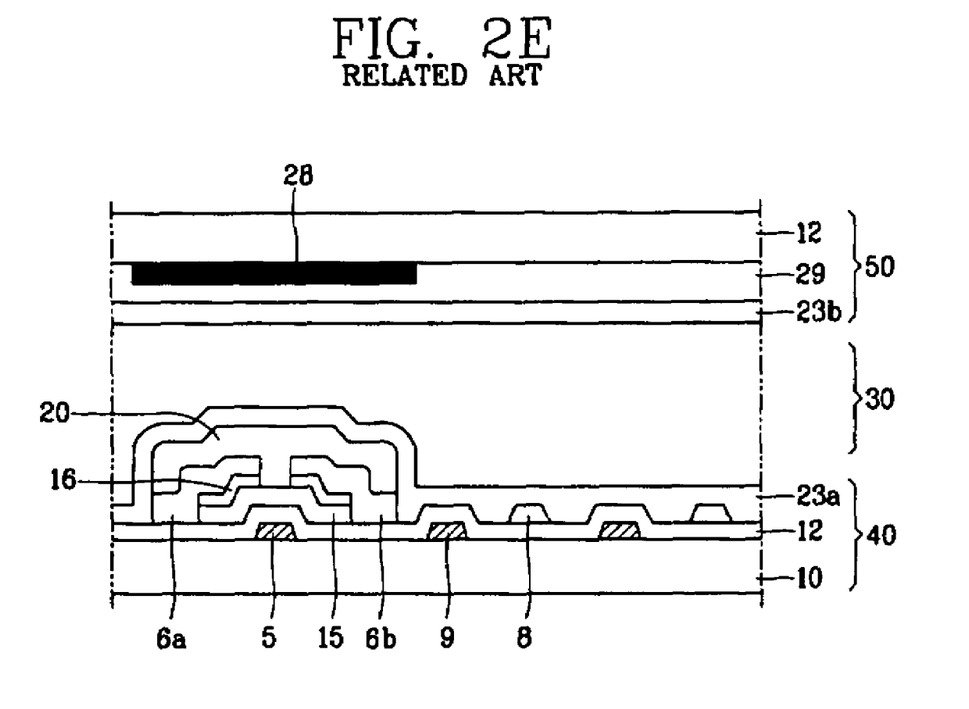
FIG. 2E depicts an alignment processing step in a fabricating method of an in-plane switching mode LCD device in accordance with the related art.

FIG. 2E depicts an alignment processing step in a fabricating method of an in-plane switching mode LCD device in accordance with the related art. As shown in FIG. 2E, a first alignment film 23a is subsequently deposited on the entire substrate. Subsequently, an alignment process is performed on the first alignment film 23a in order to fabricate a thin film transistor substrate 40. Moreover, a black matrix 28 is formed on a second transparent substrate 12 to prevent leakage of light to the thin film transistor T, the gate line, and the data line. Furthermore, a color filter layer 29 is formed thereon, and a second alignment film 23b is deposited on the entire substrate to fabricate a color filter substrate 50. Thereafter, a liquid crystal is injected between the thin film transistor substrate 40 and the color filter substrate 50 to form a liquid crystal layer 30.

When the device is completed by the aforementioned processes, an electric test is performed to detect opened or shorted lines. In this respect, a partial charge may be generated within the substrate by frequent movements of the liquid crystal display panel attached by the thin film transistor substrate and the color filter substrate. If a charged region is generated within the thin film transistor substrate, the liquid crystal may not be properly driven in the charged region during an automatic lighting test, thereby generating a stain on an image. The stain is called electrostatic stain.

Figure 3:
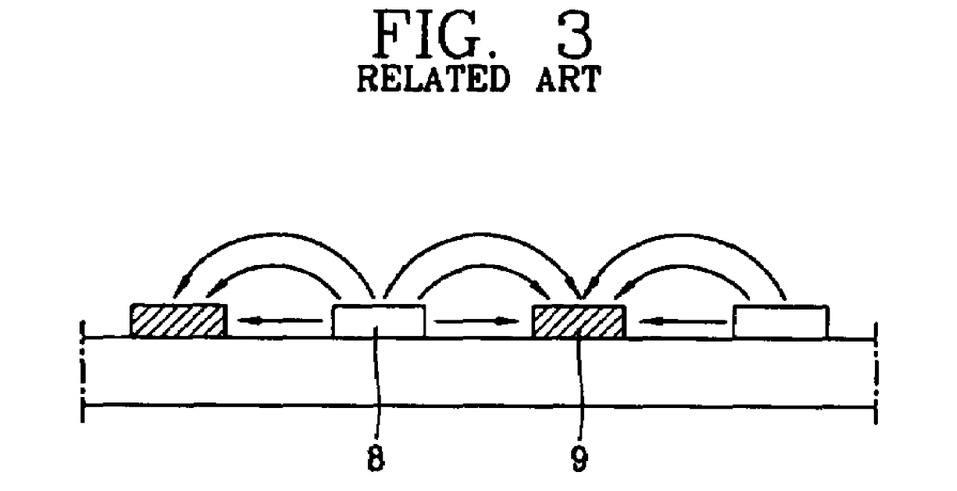
FIG. 3 is a sectional view of a normally driven liquid crystal display device.

FIG. 3 is a sectional view of a normally driven liquid crystal display device. As shown in FIG. 3, in the absence of a charged region within the thin film transistor substrate, the liquid crystal display device is normally driven. Accordingly, if a voltage is applied between the pixel electrode 8 and the common electrode 9, a lateral field having a constant direction is generated therebetween. Accordingly, the liquid crystal is twisted towards the field direction in accordance with an intensity of the applied voltage.

Figure 4:
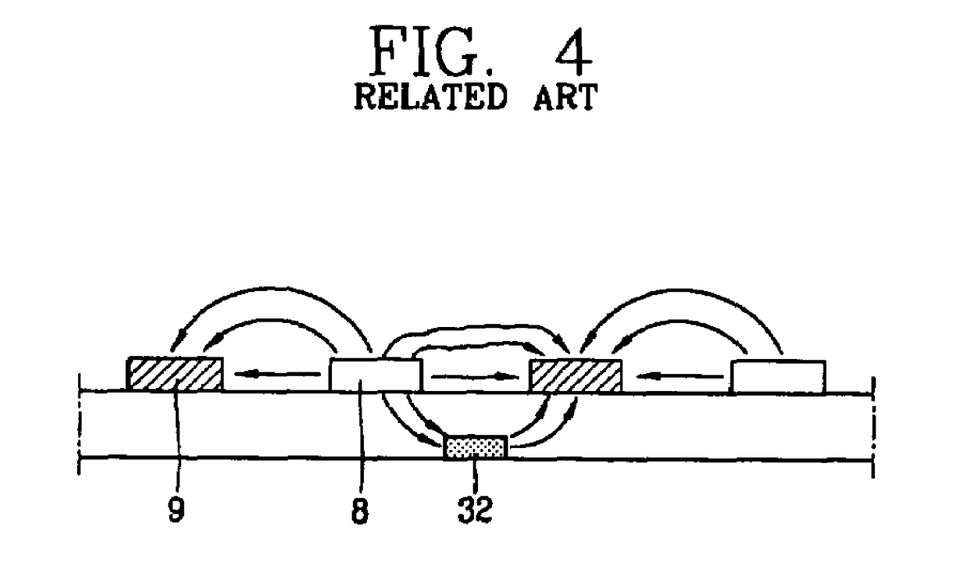
FIG. 4 is a sectional view of an abnormally driven liquid crystal display device due to a back surface charge of a thin film transistor in accordance with the related art.

FIG. 4 is a sectional view of an abnormally driven liquid crystal display device due to a back surface charge of a thin film transistor in accordance with the related art. As shown if FIG. 4, when a partial charge is generated at the back surface of the thin film transistor substrate by frequent movements of the substrate during processing, the charged region 32 distorts the electric field between the pixel electrode 8 and the common electrode 9. Accordingly, the liquid crystal aligned near the charged region is not normally driven but generates a stain on the image during lighting. Accordingly, because the lighting test is performed in a state where the liquid crystal display panel is not completely discharged, a picture quality is greatly influenced during the lighting test, thereby preventing accurate detection of defects in the liquid crystal display panel.

SUMMARY OF THE INVENTION

Accordingly, the present invention is directed to a method for discharging an in-plane switching mode liquid crystal display device that obviates one of more of the problems due to limitations and disadvantages of the related art.

An object of the present invention is to provide a method for discharging an in-plane switching mode liquid crystal display device that can prevent generation of an electrostatic stain during a lighting test.

Another object of the present invention is to provide a method for fabricating an in-plane switching mode liquid crystal display panel where generation of an electrostatic stain during a lighting test is prevented.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, the method for discharging an in-plane switching mode liquid crystal display panel includes providing a color filter substrate and a thin film transistor substrate, forming a liquid crystal layer between the color filter substrate and the thin film transistor substrate to form a liquid crystal display panel, and discharging at least one surface of the liquid crystal display panel using an ionizer system.

In another aspect of the present invention, the method for discharging an in-plane switching mode liquid crystal display panel includes forming a color filter substrate and a thin film transistor substrate, forming a liquid crystal layer between the color filter substrate and the thin film transistor substrate to form a liquid crystal display panel, discharging the thin film transistor substrate of the liquid crystal display panel, and performing a lighting test for the liquid crystal display panel.

In another aspect of the present invention, the method for discharging an in-plane switching mode liquid crystal display panel includes forming a color filter substrate and a thin film transistor substrate, forming a liquid crystal layer between the color filter substrate and the thin film transistor substrate to form a liquid crystal display panel, simultaneously discharging the color filter substrate and the thin film transistor substrate of the liquid crystal display panel, and performing a lighting test for the liquid crystal display panel.

In another aspect of the present invention, the method for fabricating an in-plane switching mode liquid crystal display panel includes forming a thin film transistor substrate and a color filter substrate, forming a plurality of thin film transistors on the thin film transistor substrate, forming a color filter on the color filter substrate, forming an alignment layer uniformly on the thin film transistor substrate, attaching the thin film transistor substrate to the color filter substrate, and providing an ionizer for removing an electrostatic charge from the liquid crystal display panel.

In another aspect of the present invention, the method for fabricating an in-plane switching mode liquid crystal display panel includes forming a thin film transistor substrate and a color filter substrate, forming a plurality of thin film transistors on the thin film transistor substrate, forming a color filter on the color filter substrate, attaching the thin film transistor substrate to the color filter substrate to form a liquid crystal display panel, and injecting a liquid crystal into an opening of the liquid crystal display panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 5:
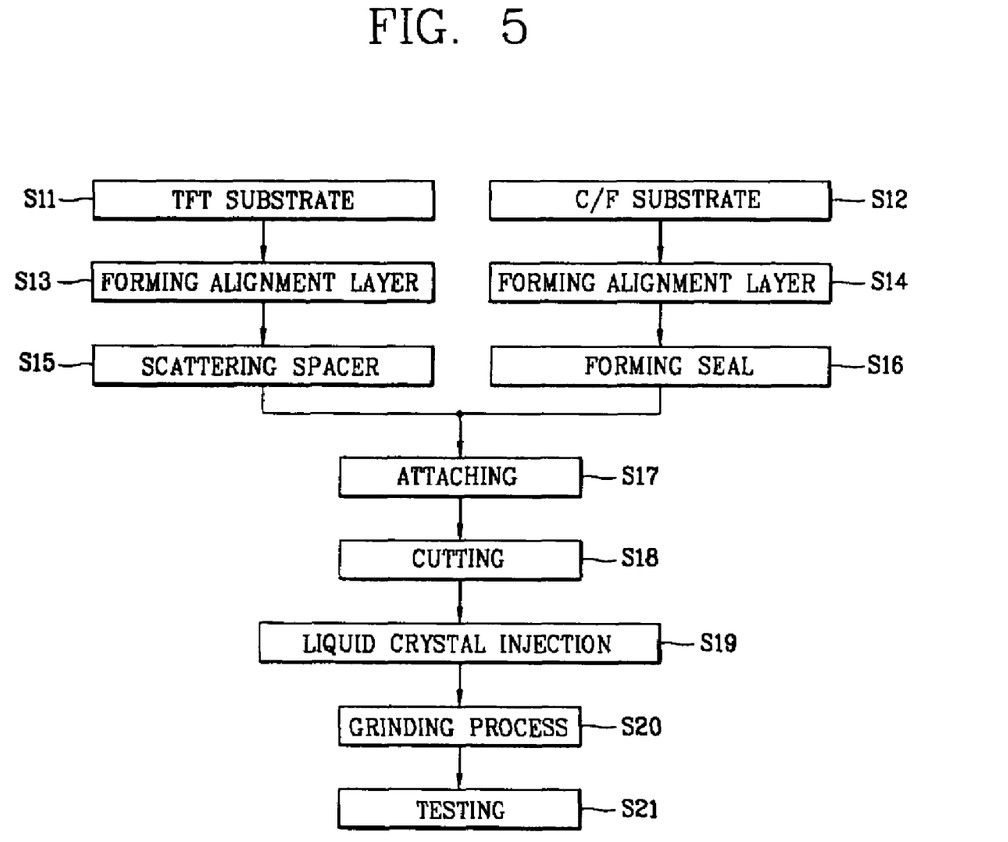
FIG. 5 is a processing flow chart representing an exemplary general liquid crystal display device according to an embodiment of the present invention.

FIG. 5 is a processing flow chart representing an exemplary general liquid crystal display device according to an embodiment of the present invention. Specifically, a process for fabricating an in-plane switching mode liquid crystal display panel is shown in FIG. 5. First, a thin film transistor substrate and a color filter substrate may be provided (S11, S12), wherein a plurality of thin film transistors may have been formed on the thin film transistor substrate, and a color filter may have been formed on the color filter substrate. In this regard, an exemplary process for fabricating the thin film transistor substrate is shown in FIGS. 2A to 2E.

Next, alignment layers may be formed on the thin film transistor substrate and the color filter substrate, respectively (S13, S14). Processes for forming an alignment layer may include a process for applying a thin film of polymer and a rubbing process. The thin film of high polymer is generally called the alignment film. The alignment film has to be applied uniformly to the entire thin film transistor substrate. Similarly, the rubbing film has to be uniform.

The rubbing process is a main process for determining an initial arrangement direction of a liquid crystal. Liquid crystal molecules are aligned in accordance with the rubbing direction. Accordingly, when the alignment film and the rubbing are uniformly performed, the liquid crystal molecules may be uniformly aligned and the liquid crystal display device may have uniform display characteristics.

Thereafter, a spacer may be dispersed on the thin film transistor substrate on which the alignment film is formed. A seal pattern may additionally be formed on the thin film transistor substrate or the color filter substrate (S15, S16).

The seal pattern may form a gap for a liquid crystal injection and may prevent the injected liquid crystal from leaking. Typically, the seal pattern may be completed by forming thermosetting resin as a desired uniform pattern by a screen printing method.

At the completion of the spacer process and the seal pattern process, the color filter substrate and the thin film transistor substrate may be attached to each other (S17). At this stage, the color filter substrate may have been provided with a printed color filter. Moreover, a thin film transistor, a pixel electrode, and a common electrode may have been arranged on the thin film transistor substrate.

The attachment of the thin film transistor substrate and the color filter substrate may be determined within a margin specified at the design time of each substrate. The required margin of error is in the order of several microns. If the error in binding the two substrates exceeds a certain range, light may leak, thereby degrading a desired picture quality when driving a liquid crystal cell.

After binding the two substrates, the resulting liquid crystal display panel may be subjected to a cutting process where the panel is cut into plural unit panels (S18). The cutting process may include a scribe process for forming a crack on the substrate by using a wheel of diamond material having greater hardness than a glass substrate. It may further include a break process for cutting the substrate on which the crack has been formed by applying a breaking force.

Following the cutting process, the panel is completed by injecting a liquid crystal into a liquid crystal injection opening of the liquid crystal display panel which has been cut into unit panels (S19). After the liquid crystal injection process, a grinding process is performed to remove a shorting bar additionally formed at an outer periphery of a pad portion. The shorting bar was formed to prevent electrostatic generation among lines during processing (S20).

Thereafter, a test is performed to detect the presence of defects in the fabricated unit panels (S21). Specifically, an operation of the thin film transistor and a pixel lighting performance are verified.

In an embodiment of the present invention, the grinding process and the test process may be performed by an in-line method. In this instance, an ionizer is provided at a position of each liquid crystal display panel as a means for removing electrostatic generated by frequent movements of the panel or by a contact with a panel carrier (for example, a robot arm). The ionizer may be provided at a lower portion of the thin film transistor substrate in order to rapidly discharge electrostatic charges generated within the thin film transistor, thereby preventing buildup of electrostatic charges within the thin film transistor.

In the case of a TN (twisted nematic) mode LCD device, even if the thin film transistor substrate is charged, the effect on picture quality during lighting is minimal. In contrast, in a plane switching mode liquid crystal display device, the pixel electrode and the common electrode are all formed on the thin film transistor substrate and the liquid crystal is driven by an electric field therebetween. Thus, if electrostatic charges accumulate within a portion of the back surface of the thin film transistor substrate, the charged region affects the electric field between the pixel electrode and the common electrode. Accordingly, the liquid crystal does not operate properly in the charged region and stain is generated on an image during lighting. Such a stain which is caused by electrostatic buildup is referred to as electrostatic stain.

Figure 6:
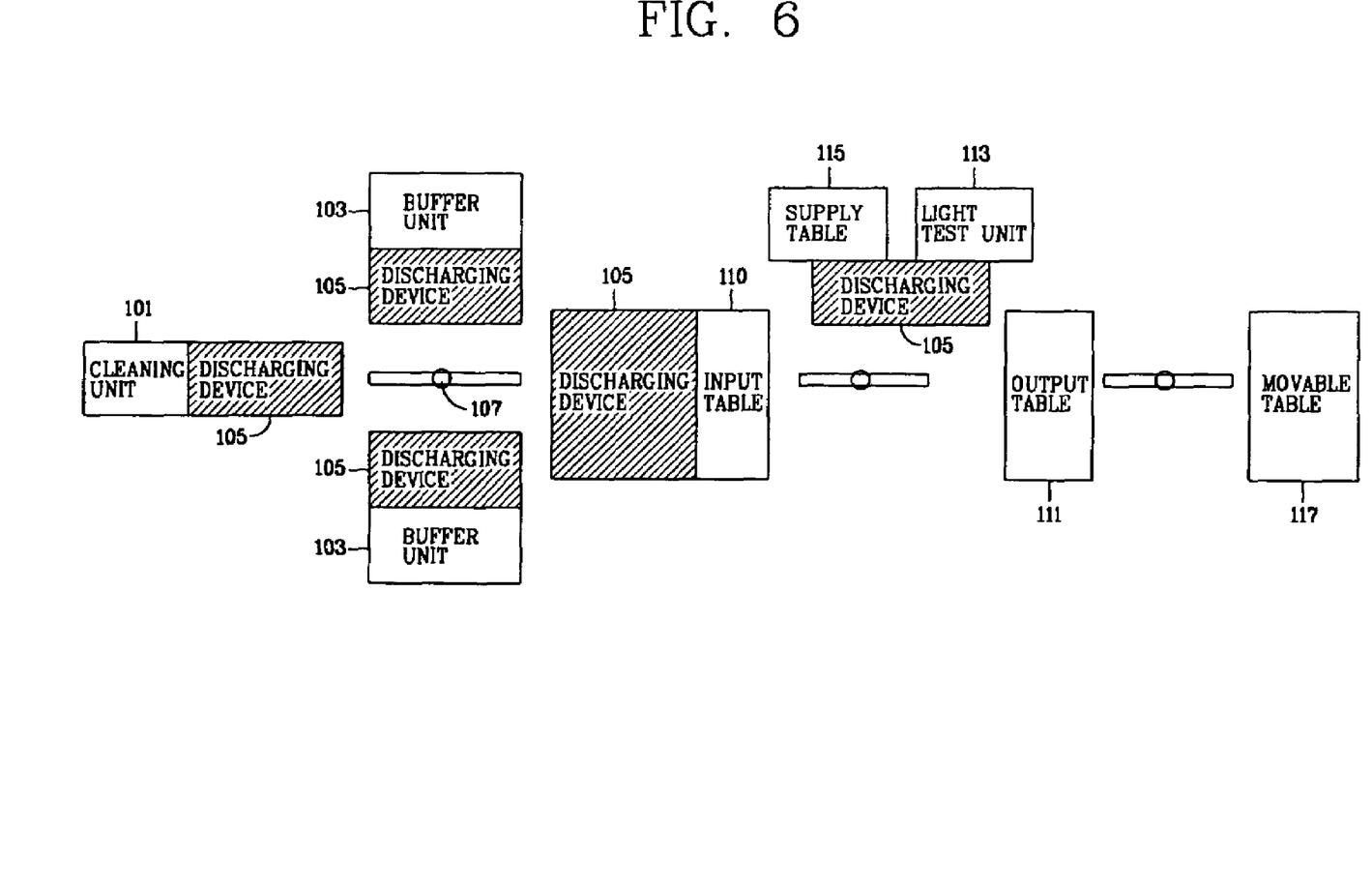
FIG. 6 is a plan view showing an exemplary layout of a test step following the liquid crystal injection and the scribe/break process according to an embodiment of the present invention.

FIG. 6 is a plan view showing an exemplary layout of a test step following the liquid crystal injection and the scribe/break process according to an embodiment of the present invention. As shown in FIG. 6, a cleaning unit 101 and a light test unit 113 are arranged serially. The cleaning unit may clean impurities generated at the time of the grinding process, and the light test unit is used to test a lighting condition of the liquid crystal display. Moreover, a robot 107 is arranged at a desired position for transferring the liquid crystal display panel.

The testing arrangement depicted in FIG. 6 may further include a buffer 103 for storing the cleaned liquid crystal display panel before the lighting test, a supply table 115 for supplying the panel to the light test unit 113, an input table 110 installed between the buffer 103 and the supply table 115, and an output table 111 for transferring the tested panel to a next process and a movable table 117.

A discharging device 105 may be provided at each of the cleaning unit 101, the buffer 103, the input table 110, and the supply table 115. The discharging device 105 removes electrostatic generated at a surface of the substrate by a minute friction during transfer of the panel. The function of the discharging device 105 is to discharge a charged region generated within the liquid crystal display panel during processing, particularly to discharge the back surface of the thin film transistor substrate. Moreover, a discharging device 105 may be positioned near at least one of the cleaning unit, the buffer unit, the input table, and the supply table. The discharging device 105 may have a discharging direction oriented from an upper direction to a lower direction and for discharging the color filter substrate.

Figure 7:
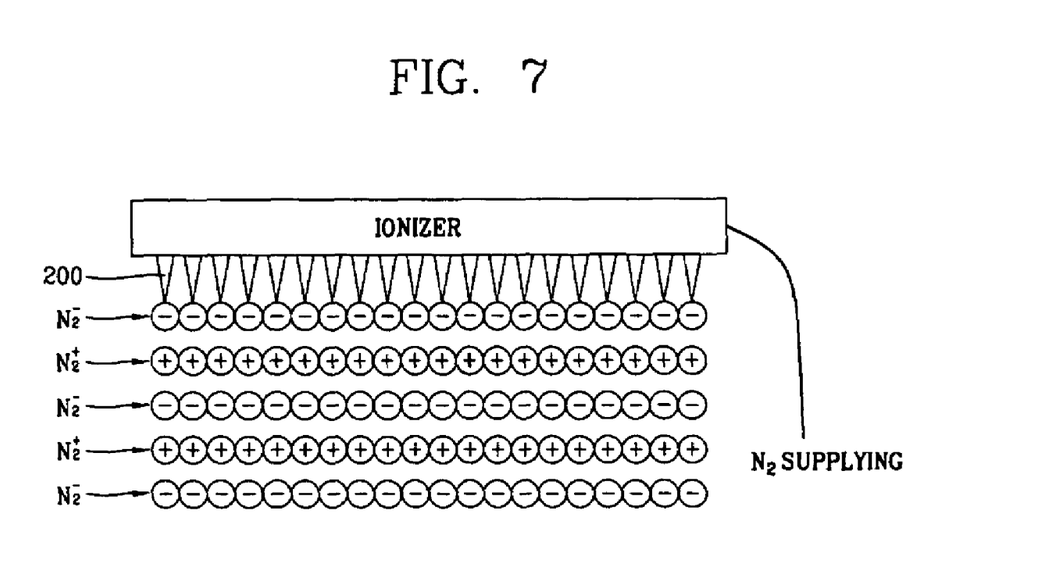
FIG. 7 depicts an exemplary principle for driving an ionizer as a discharging device according to an embodiment of to the present invention.

FIG. 7 depicts an exemplary principle for driving an ionizer as a discharging device according to an embodiment of to the present invention. As depicted in FIG. 7, if $N_2$ gas is supplied to the ionizer having plural probes 200, the ionizer continuously generates negative ions ($N_2-$) and positive ions ($N_2^+$) through the probes 200 according to a constant time interval (for example, 1/60 second). Specifically, since the negative ions and the positive ions are provided in equal amounts externally, the resulting state is neutral. Also, in case of a charged object, the charged object is neutralized by an attractive force or a repulsive force between a polarity of the charged object and the positive/negative ions generated through the probes 200.

Figure 8:
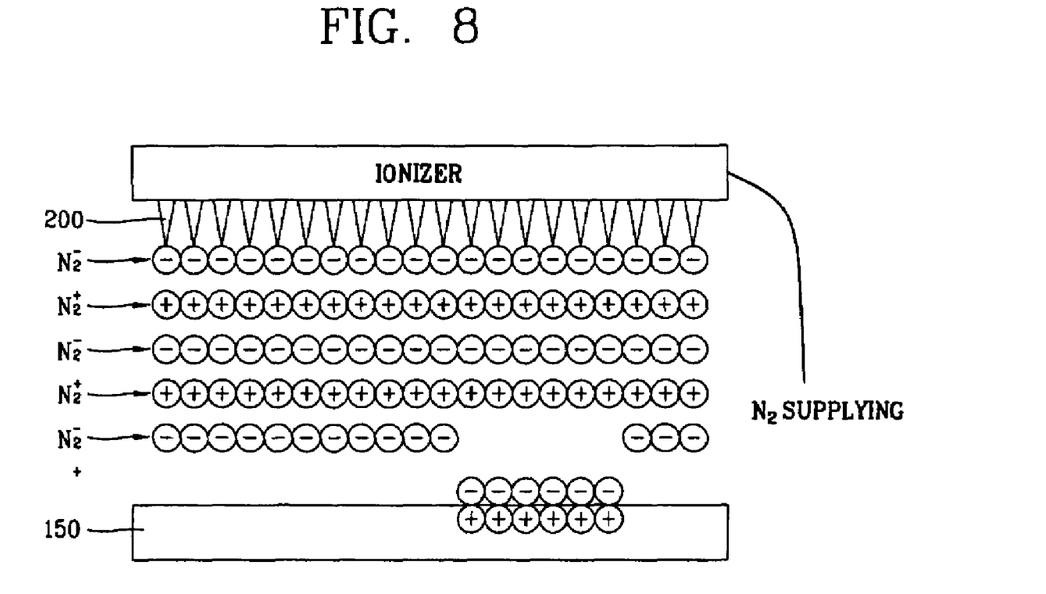
FIG. 8 shows an exemplary principle for discharging a charged object according to an embodiment of the present invention.

FIG. 8 shows an exemplary principle for discharging a charged object according to an embodiment of the present invention. When a substrate 150 is partially charged with positive ions, the positive ions supplied through the probe 200 remain static, but the negative ions move toward the positively charged substrate due to the attractive force between the negative ions and the positive substrate. Accordingly, the negative ions supplied through the probe neutralize the positive ions accumulated on the substrate 150 thereby removing the electrostatic charge within the substrate 150.

Electrostatic charges generated within the thin film transistor substrate or the color filter substrate may be removed by said discharging principle. Specifically, the present invention intensely discharges the thin film transistor substrate in a charged region where the common electrode and the pixel electrode are formed. Thus, a distortion generated between the common electrode and the pixel electrode can be prevented, thereby removing electrostatic stain generated in the charged region of the back surface of the thin film transistor substrate.

As aforementioned, the present invention discharges the back surface of the thin film transistor substrate intensively during processing the liquid crystal display panel, to prevent a degradation of the liquid crystal during driving due to accumulation of electrostatic charges within the thin film transistor substrate, thereby eliminating an electrostatic stain displayed on the screen at the time of the lighting test.

Moreover, since the electrostatic stain on the image is removed during lighting test, detection of defects during inspection of the liquid crystal display panel is facilitated thereby increasing productivity It will be apparent to those skilled in the art that various modifications and variations can be made in the method of discharging an in-plane switching mode liquid crystal device of the present invention without departing from the spirit or scope of the invention. Thus, it is intended that the present invention cover the modifications and variations of the invention provided they come within the scope of the appended claims and their equivalents.

What is claimed is:

1. A method for discharging an in-plane switching mode liquid crystal display panel, comprising:
   providing a color filter substrate and a thin film transistor substrate;
   forming a liquid crystal display panel by providing a liquid crystal layer between the color filter and thin film transistor substrates;
   subsequently discharging at least one surface of the liquid crystal display panel using an ionizer system; and
   after discharging the at least one surface of the liquid crystal display panel, performing a lighting test for the liquid crystal display panel.

2. The method of claim 1, wherein the discharged surface is on the thin film transistor substrate.

3. The method of claim 1, wherein the discharged surface is on the color filter substrate.

4. A method for discharging an in-plane switching mode liquid crystal display panel, comprising:
   forming a color filter substrate and a thin film transistor substrate;
   providing a liquid crystal layer between the color filter and thin film transistor substrates to form a liquid crystal display panel;
   subsequently discharging the thin film transistor substrate of the liquid crystal display panel; and
   after discharging the thin film transistor substrate, performing a lighting test for the liquid crystal display panel.

5. The method of claim 4, wherein the discharging of the thin film transistor is performed using an ionizer system.

6. A method for fabricating an in-plane switching mode liquid crystal display panel, comprising:
   providing a first substrate and a second substrate;
   forming a plurality of thin film transistors on the first substrate;
   forming a color filter on the second substrate;
   forming an alignment layer on the first and the second substrates;
   forming a liquid crystal display panel by attaching the first substrate to the second substrate; and
   subsequently providing a discharging device for removing an electrostatic charge from the liquid crystal display panel,
   wherein the discharging device is disposed at a rear surface of the thin film transistor substrate of the liquid crystal display panel.

7. The method of claim 6, wherein forming the alignment layer includes applying a thin film of polymer and performing a rubbing process.

8. The method of claim 6, wherein the first substrate includes a thin film transistor, a pixel electrode and a common electrode.

9. The method of claim 6, further comprising:
   forming a liquid crystal layer between the first substrate and the second substrate of the liquid crystal display panel.

10. The method of claim 6, further comprising removing a shorting bar formed at an outer periphery of a pad portion of the liquid crystal display panel.

11. The method of claim 6, further comprising:
    disposing serially a cleaning unit and a lighting test unit.

12. The method of claim 11, wherein a discharging direction of the discharging device is oriented from an upper direction to a lower direction.

13. The method of claim 9, further comprising supplying continuously positive ions and negative ions in equal amounts through a plurality of probes to the first substrate.

14. The method of claim 13, wherein the negative ions are ($N_2^-$) and the positive ions are ($N_2^+$).

15. The method of claim 11, further comprising providing the discharging device at each of the cleaning unit and the lighting test unit to remove an electrostatic charge from a back surface of the first substrate.

* * * * *